Feb. 26, 1935. I. A. WANNEMACHER 1,992,791
PLOWSHARE BLADE
Filed Aug. 29, 1933
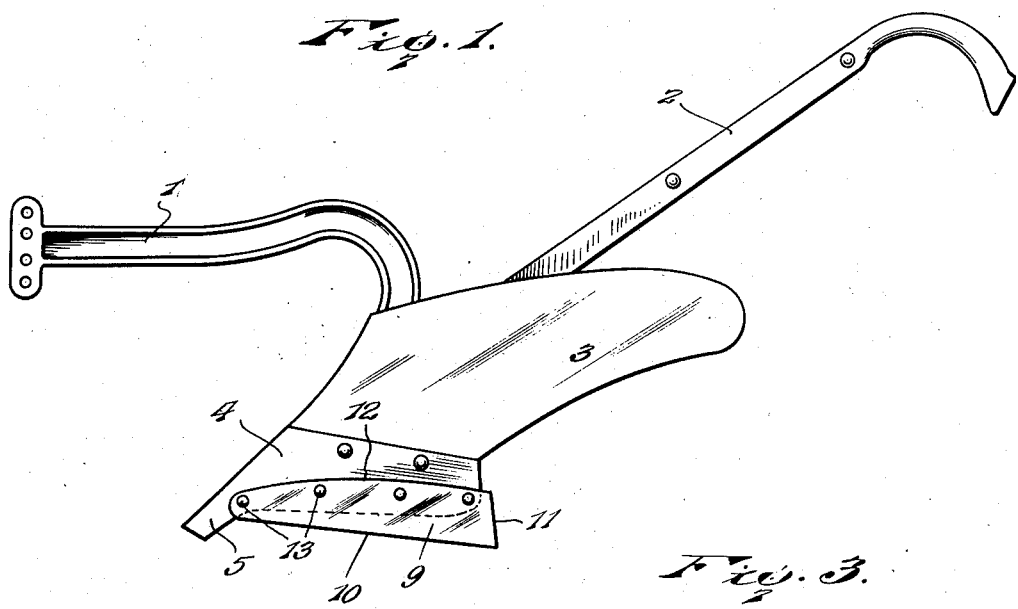
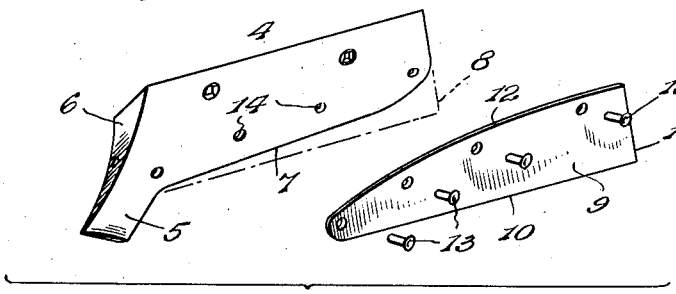
Inventor
I. A. Wannemacher.
By Lacey & Lacey, Attorneys Patented Feb. 26, 1935

1,992,791

UNITED STATES PATENT OFFICE 1,992,791

PLOWSHARE BLADE

Isidor A. Wannemacher, Fort Jennings, Ohio, assignor of one-half to F. A. Wannemacher, Celina, Ohio Application August 29, 1933, Serial No. 687,350

1 Claim. (Cl. 97—125)

The object of this invention is to provide an attachment for plowshares whereby after a plowshare has been worn so that it fails to cut to the full width for which it was originally intended, an effective cutting edge may be provided so that the plow will continue to turn over the earth for the full width originally designed. It is well-known that plowshares are worn away along their cutting edges through continued use and the outer corners are worn off so that after a few seasons' use the furrow or swath turned over by the plow is appreciably less than that originally turned over. My invention provides a supplemental blade which may be easily secured upon a plowshare so as to supply a cutting edge as long, or longer, than the original cutting edge possessed by the plow. This object is attained by means illustrated in the accompanying drawing and hereinafter described, and the invention resides in certain novel features which are particularly defined in the claim.

In the annexed drawing, Fig. 1 is an elevation of a plow having my improved blade applied thereto, Fig. 2 is a perspective view showing the plowshare and the blade detached but approximately in their proper relative positions, Fig. 3 is an enlarged detail section through the share and the blade.

In the drawing, the reference numeral 1 designates the plow beam and the numeral 2 designates handles which are of the usual or any approved form and which rise from the moldboard 3 in the usual manner. The moldboard is secured along its lower edge to the plowshare 4 which is rigidly secured to the lower end of the beam and standard and has its point 5 provided with the usual branch 6 to which the landside is secured. The share 4 is originally formed with a cutting edge 7 extending laterally from the point 5 and originally this cutting edge extends to the end of the share and forms a sharp angle therewith, as indicated at 8 by dotted lines. Through long continued use, the cutting edge of the share is worn away to the form shown by full lines in Fig. 2 and by dotted lines in Fig. 1 and it will be noted at once that the corner will be entirely worn away and therefore the share will not cut a swath having the full width for which the share was originally designed. To meet this condition, I have provided a blade 9 which is constructed of hard thin steel and has a straight cutting edge 10 meeting the outer end 11 of the blade in a sharp angle so that the blade, when in use, will cut a swath having a width equal to that originally cut by the share. The upper edge of the blade is slightly curved, as shown at 12, and near said edge are a series of openings through which rivets 13 may be inserted to firmly secure the blade to the share, rivet-receiving openings being formed in the share at proper points, as indicated at 14. The blade will project beyond the edge of the share, as will be readily understood from Fig. 1, and it will have sufficient strength and hardness to resist the hard usage to which it is subjected while it will be thin so as to be sufficiently flexible to conform to the surface of the share and seat firmly and flatly against the same.

My blade has been found, after extensive use, to be highly efficient and to prolong the effective life of a plow without excessive cost. The blade may be applied to any share and when applied will fit closely thereto with its cutting edge projecting beyond the edge of the share and, by reason of its thinness, the blade will cut through roots instead of merely pulling at them in a manner which causes the wearing away of the plowshare.

Moreover, after a plow has been equipped with my blade less power is required to urge the plow through the ground, and it has been found that a saving of one-third in consumption of fuel, when the plow is drawn by a tractor, has been effected.

Having thus described the invention, I claim:

An attachment for worn plowshares comprising an elongated thin blade of flexible steel, said blade being substantially triangular in shape and having a longitudinally curved upper edge and a straight lower edge extending forwardly from a straight rear edge in converging relation to each other, fastener receiving openings being formed in the blade adjacent the upper edge thereof in spaced relation to each other longitudinally of the blade, and fasteners insertable through said openings and through companion openings formed in a plowshare to rigidly secure the blade in flat contacting engagement with the front face of the plowshare with the lower portion of the blade projecting downwardly below the plowshare.

ISIDOR A. WANNEMACHER. [L. S.]